US012367853B2

(12) United States Patent
Lowe

(10) Patent No.: US 12,367,853 B2
(45) Date of Patent: Jul. 22, 2025

(54) MULTI-COURSE STRINGED INSTRUMENT BRIDGE ASSEMBLY

(71) Applicant: Brad Lowe, Odessa, FL (US)

(72) Inventor: Brad Lowe, Odessa, FL (US)

(73) Assignee: Brad Lowe, Odessa, FL (US)

( * ) Notice: Subject to any disclaimer, the term of this patent is extended or adjusted under 35 U.S.C. 154(b) by 210 days.

(21) Appl. No.: 18/236,282

(22) Filed: Aug. 21, 2023

(65) Prior Publication Data

US 2025/0069570 A1 Feb. 27, 2025

(51) Int. Cl.
*G10D 3/04* (2020.01)
*G10D 1/08* (2006.01)

(52) U.S. Cl.
CPC ................. *G10D 3/04* (2013.01); *G10D 1/08* (2013.01)

(58) Field of Classification Search
CPC ................................... G10D 3/04; G10D 1/08
See application file for complete search history.

(56) References Cited

U.S. PATENT DOCUMENTS

| | | | | |
|---|---|---|---|---|
| 6,875,910 B2 * | 4/2005 | Naimish | .................. | G10D 3/04 84/298 |
| 2005/0045018 A1 * | 3/2005 | Turner | ..................... | G10D 3/04 84/298 |
| 2022/0101816 A1 * | 3/2022 | Swope | ..................... | G10D 3/04 |
| 2025/0069570 A1 * | 2/2025 | Lowe | ....................... | G10D 1/08 |

* cited by examiner

*Primary Examiner* — Robert W Horn
(74) *Attorney, Agent, or Firm* — Much Shelist, P.C.; Patrick D. Richards

(57) ABSTRACT

A multi-course bridge assembly includes: a mounting plate; and a plurality of bridge saddles secured to the mounting plate, wherein each bridge saddle includes a groove formed by the intersection of a vertical planar surface and an angled planar surface, wherein the groove tapers from being wider and deeper near a back side of the bridge saddle to being narrower and shallower near a front side of the bridge saddle. The bridge saddles are arranged in mirror image pairs and the vertical planar surface of each bridge saddle in each mirror image pair is located closer to the vertical planar surface of the paired bridge saddle than to the angled planar surface of the paired bridge saddle.

7 Claims, 11 Drawing Sheets

MULTI-COURSE STRINGED INSTRUMENT BRIDGE ASSEMBLY

CROSS-REFERENCE TO RELATED APPLICATIONS

None.

BACKGROUND

The present disclosure relates to a bridge for multi-course stringed instrument. More specifically, the present disclosure is directed to a multi-course bridge assembly for use with an eight-string bass guitar and similar instruments.

Guitars and basses vary widely in design; including varying in shape, size, numbers of strings, number and types of pickups, etc. However, standard guitars and basses each include a body and a neck, with a number of strings spanning a bridge at one end of the body and a nut at a far end of the neck. A number of tuning pegs located in a headstock on the other side of the nut are used to vary the tension of the strings. In electric guitars and basses, the strings pass over one or more magnetic pickups, which convert the vibrations of the strings into electrical signals. In acoustic guitars and basses, the strings pass over a sound hole to amplify the sound. There are typically a number of frets transversely spanning the width of neck that the musician uses to make each string play at the desired pitch, though there are fretless instruments as well.

The design and setup of the bridge is critical in maintaining appropriate tuning of the instrument when playing notes along the length of the neck, as well as providing optimum comfort and playability at all fretted locations along the neck. Adjustable bridges typically include a base onto which a number of bridge saddles mount. The bridge saddles are usually adjustable in height above the base, as well as in in depth relative to the vibrating string length (the length of each string between the bridge and the nut is known as the vibrating string length). In other words, the bridge saddles can typically be adjusted to raise or lower the strings above the body and neck and to shorten and lengthen the vibrating length of the strings.

For fretted instruments, such as standard guitars and basses, each string must be intonated to play in tune along the length of the neck. Intonating each string involves moving the witness point, the point at which the vibrating length of each string meets the front edge of the bridge saddle supporting it, closer to or further from the nut. Numerous factors go into setting the intonation for each string, including the diameter of the string and the height of the string above the frets.

In addition, bridges are responsible for setting the string spacing, the distance between adjacent strings. A given musician's preferences and playing style can influence what string spacing feels most comfortable, though consistency and stability are universally valuable.

A subset of string instruments is considered "multi-course" instruments. A standard guitar has six strings, tuned EADGbe and a standard bass has four strings tuned EADG. One example of a multi-course bass is an eight-string bass arranged in four courses (i.e., pairs) in which each course is tuned in octaves. In other words, a first course includes a first string tuned to an E and a second string tuned to an E that is one octave higher, a second course includes a pair of A strings tuned an octave apart, a third course includes a pair of D strings tuned an octave apart, and a fourth course includes a pair of G strings tuned an octave apart.

Another example of a multi-course bass may be a twelve string bass in which each course includes three strings, a root string and two strings tuned an octave above the root. Although often tuned in octaves, each course can be tuned in any harmonic relationship, such as in thirds or in fifths. As one moves further from traditional bass design, there can be any number of courses (four, five, six and beyond), each including any number of strings tuned in any relationship.

One example of a multi-course guitar is a twelve-string guitar in which the twelve strings are arranged in six courses with the lower four courses being tuned in octaves and the upper two courses being tuned in unison. But again, there may any number of courses each including any number of strings each tuned in any desired relationship.

In multi-course instruments with non-unison string pairs, each string pair typically includes strings of different gauges (i.e., diameters) due to the inherent relationship between string gauge, string tension, and vibrating length and the note that is produced by the vibrating string. With all other variables held constant, higher gauge strings (i.e., larger diameter strings) produce lower tones. Thus, each string pair typically includes one higher gauge string and one lower gauge string.

Multi-course instruments, and particularly those with non-unison string pairs, present many challenges from a design perspective, especially at the bridge. An ideal configuration for a multi-course instrument will allow each individual string (e.g., both root and octave) to be adjusted for both height and intonation. Further, an ideal configuration will also maintain constant string-to-string spacing between string pairs and string courses. Such a configuration will ensure the greatest capacity for the instrument to remain in tune, with optimum playability at all fretted locations on the neck.

Accordingly, there is a need for a multi-course bridge assembly, as described herein.

SUMMARY

To meet the needs noted above and others, the present disclosure provides a multi-course bridge assembly for use with an eight-string bass guitar and similar instruments. As shown and described herein, the multi-course bridge assembly includes a mounting plate and a number of adjustable bridge saddles arranged in the desired number of courses. Each bridge saddle is adjustable by height (i.e., above the body and neck) and depth (i.e., the vibrating string length) and arranged to enable stable and consistent string-spacing between and within each course.

In a primary example, an eight-string bass bridge produced according to the teachings provided herein includes eight individual adjustable bridge saddles arranged into four courses of saddles pairs. Each saddle is generally L-shaped with the root and octave saddle pairs designed as mirror images of each other. Each string's alignment over its saddle is facilitated by a groove that includes a vertical planar surface on an interior face of the groove (i.e., the side of the groove nearest the saddle's corresponding pair) and an angled planar surface on an exterior face of the groove. The groove design helps to maintain constant string-to-string spacing (measured string edge to string edge) within each saddle pair. In addition, saddle height adjustment screws are located on a surface that is below the string's witness point (i.e., the point of contact between the string and the bridge saddle) to allow string height adjustment without interfering with the string's playing action. The combination of these design elements allows each individual string to be adjusted for height and intonation while maintaining consistent string-to-string spacing between string pairs in each course.

The multi-course bridge can be adapted for any number of courses. For example, the multi-course bridge may be adapted for use with a ten-string, five-course bass (e.g. tuned BbEeAaDdGg or EeAaDdGgCc) or a twelve-string, six-course bass (e.g., tuned BbEeAaDdGgCc or EeAaDdGgCcFf). Similarly, the multi-course bridge may be adapted for use with a twelve-string, six-course guitar (e.g. tuned EeAaDdGgbbee). Those skilled in the art will understand how to adapt the multi-course bridge to any number of courses tuned in any manner based on the teachings provided herein.

The bridge saddle taught herein is a key component in the flexibility and adaptability of the multi-course bridge. As noted above, each saddle groove includes a vertical planar face. Therefore, as long as each string seats at least half of its diameter into the groove, the vertical planar face of the groove aligns tangentially with the string edge. Accordingly, by positioning the vertical faces of adjacent bridge saddles towards each other, the edge-to-edge string spacing between pairs of strings on adjacent bridge saddles is consistent and fixed, regardless of the gauge string held in each groove. In addition, because of the alignment of the bridge saddles across the width of the mounting plate, the centerline-to-centerline distance between each saddle pair is consistent and fixed, regardless of the gauge string held in each groove.

In one embodiment, the depth of each bridge saddle is individually adjustable to the desired vibrating string length by a depth adjustment screw and spring spanning between the back of the mounting plate and the back of the bridge saddle and the height of each bridge saddle is individually adjustable as well using two height adjustment screws that extend from the bottom of each bridge saddle to rest against the base of the mounting plate. In this embodiment, the string groove is located in a portion of the saddle that is offset laterally from the main body of the saddle and the depth adjustment screw, enabling the string to pass through the back wall of the mounting plate, through the groove, and over the witness point without any interference from the saddle or its adjustment screw. Further, the height adjustment screws are located in front of and below the groove such that they do not interfere with the vibrating length of the string in any way.

In some embodiments, a locking screw hole is located in a side wall of the mounting plate. A locking screw threads through the locking screw hole to contact the side of the nearest bridge saddle and, by applying pressure to that bridge saddle, lock the entire series of bridge saddles into position.

In one embodiment, a multi-course bridge assembly includes: a mounting plate; and a plurality of bridge saddles secured to the mounting plate, wherein each bridge saddle includes a groove formed by the intersection of a vertical planar surface and an angled planar surface, wherein the groove tapers from being wider and deeper near a back side of the bridge saddle to being narrower and shallower near a front side of the bridge saddle. The bridge saddles are arranged in mirror image pairs and the vertical planar surface of each bridge saddle in each mirror image pair is located closer to the vertical planar surface of the paired bridge saddle than to the angled planar surface of the paired bridge saddle. Each bridge saddle includes an internally threaded depth adjustment hole and two internally threaded height adjustment holes. The two height adjustment holes are located below the narrower and shallower portion of the groove and the groove is offset laterally from the depth adjustment hole. The mounting plate includes a locking screw hole in a side wall.

An objective and advantage of the invention is to provide an adjustable bridge for multi-course instruments that enables individual height and depth adjustments for each saddle while providing stable and consistent string spacing between and within each course of strings.

Another objective and advantage of the invention is provide a multi-course bridge whose design is adaptable for multi-course instruments with a wide range of courses and tunings.

Another objective and advantage of the invention is provide an adjustable bridge for multi-course instruments in which the adjustment mechanisms do not interfere with the stringing and playing of the instrument.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
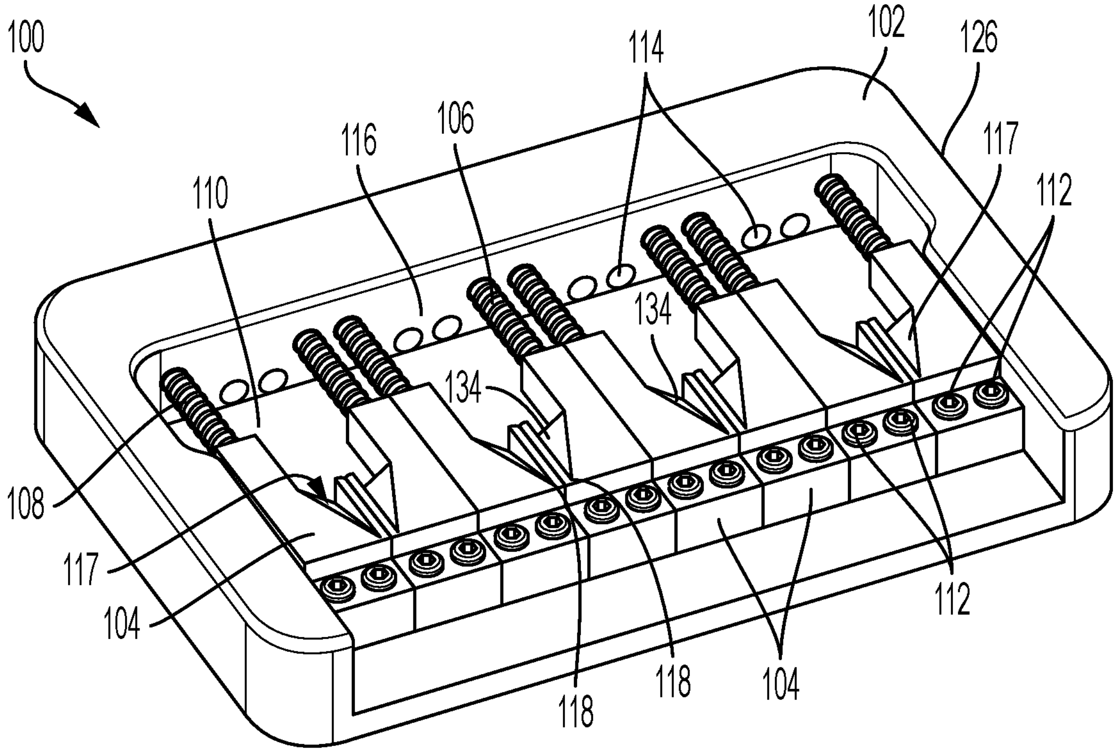
FIG. 1 is an isometric view of a multi-course bridge assembly.
Figure 2:
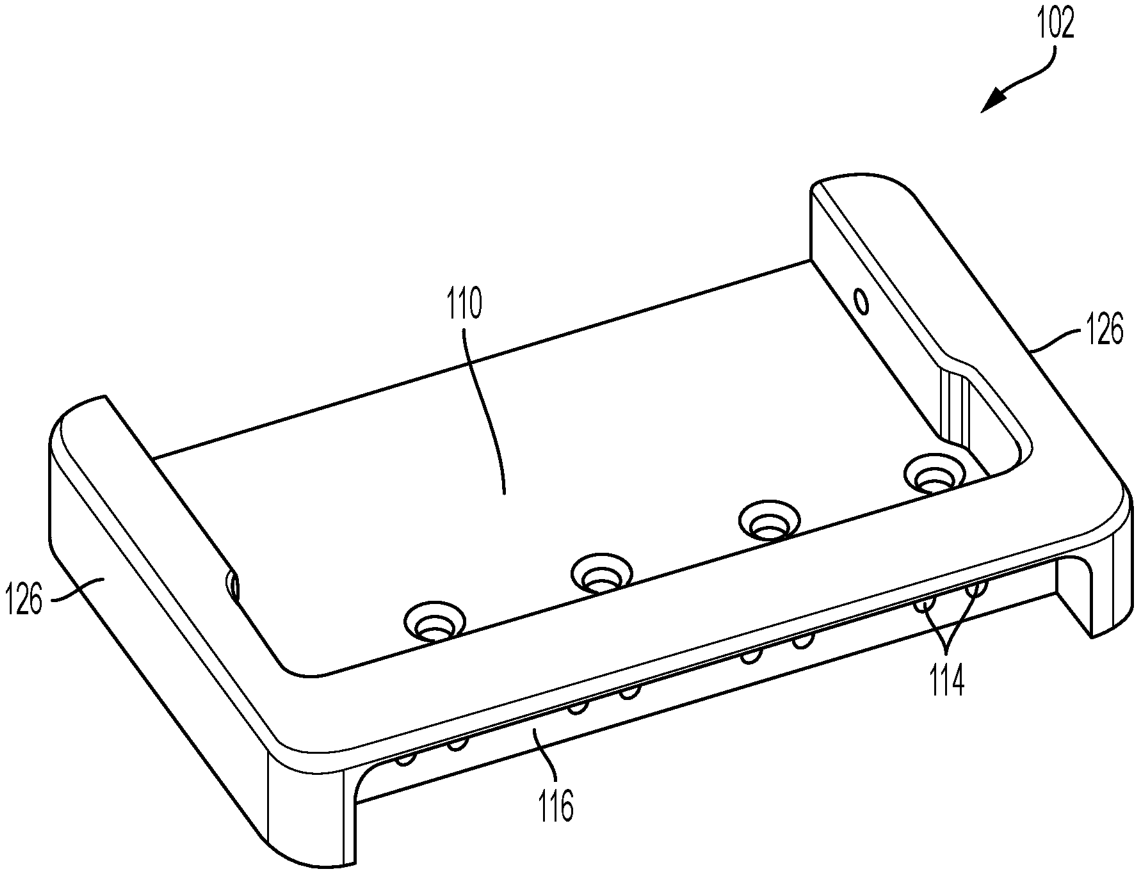
FIG. 2 is an isometric view of the mounting plate of the multi-course bridge assembly shown in FIG. 1.
Figure 3:
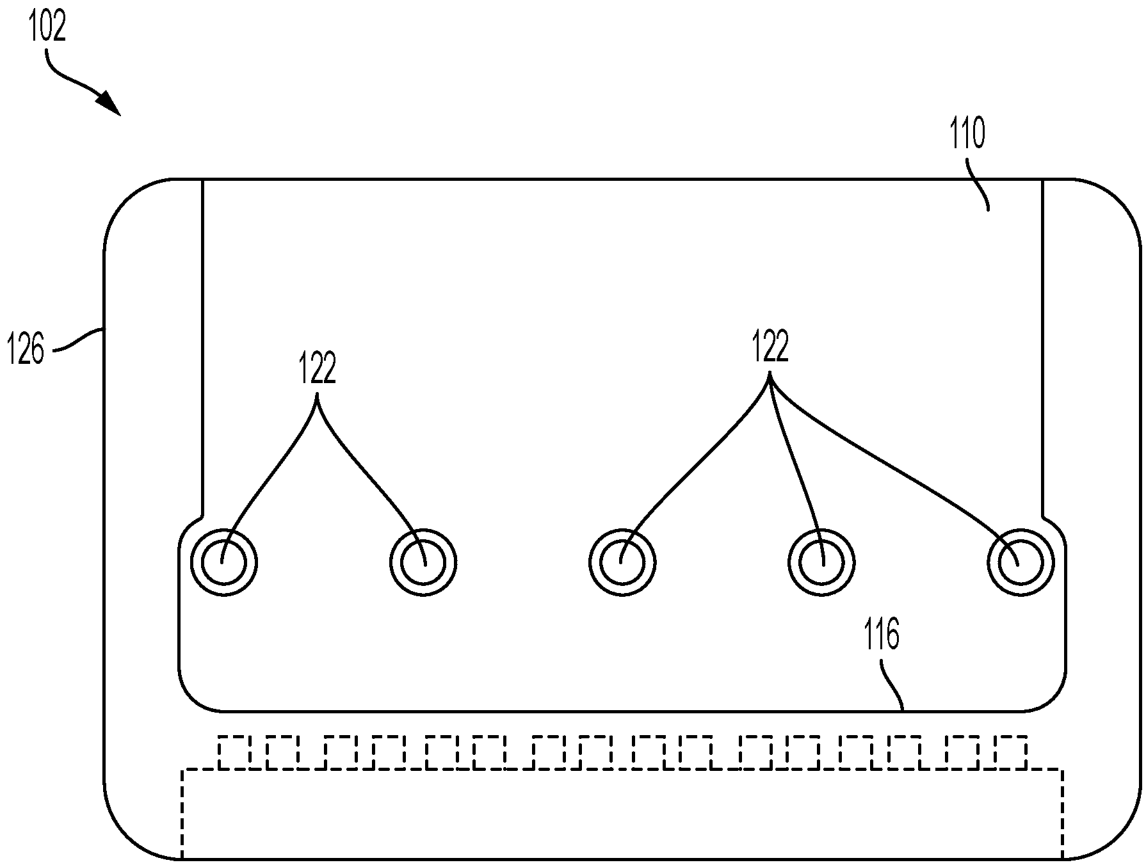
FIG. 3 is a top plan view of the mounting plate of FIG. 2.
Figure 4:
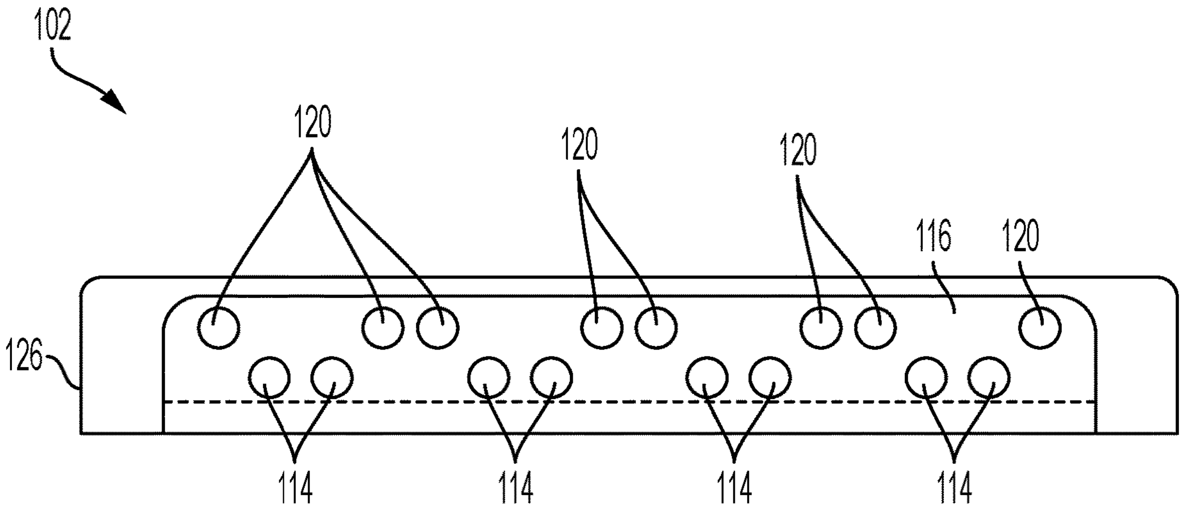
FIG. 4 is a back side elevation view of the mounting plate of FIG. 2.
Figure 5:
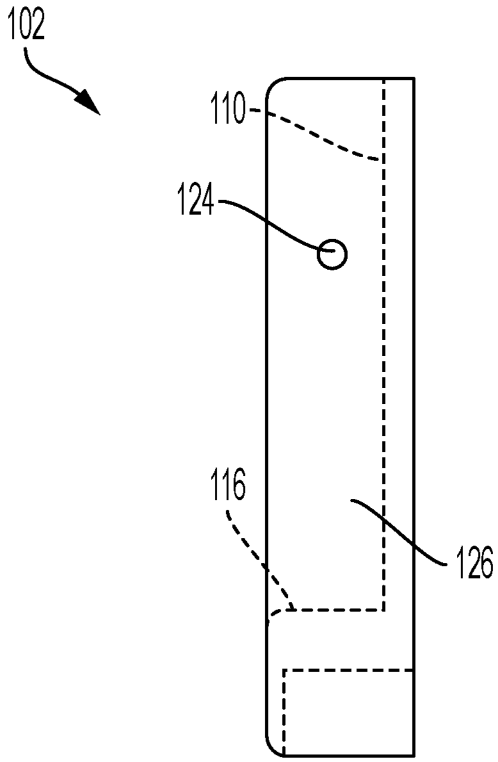
FIG. 5 is a right side elevation view of the mounting plate of FIG. 2.
Figure 6:
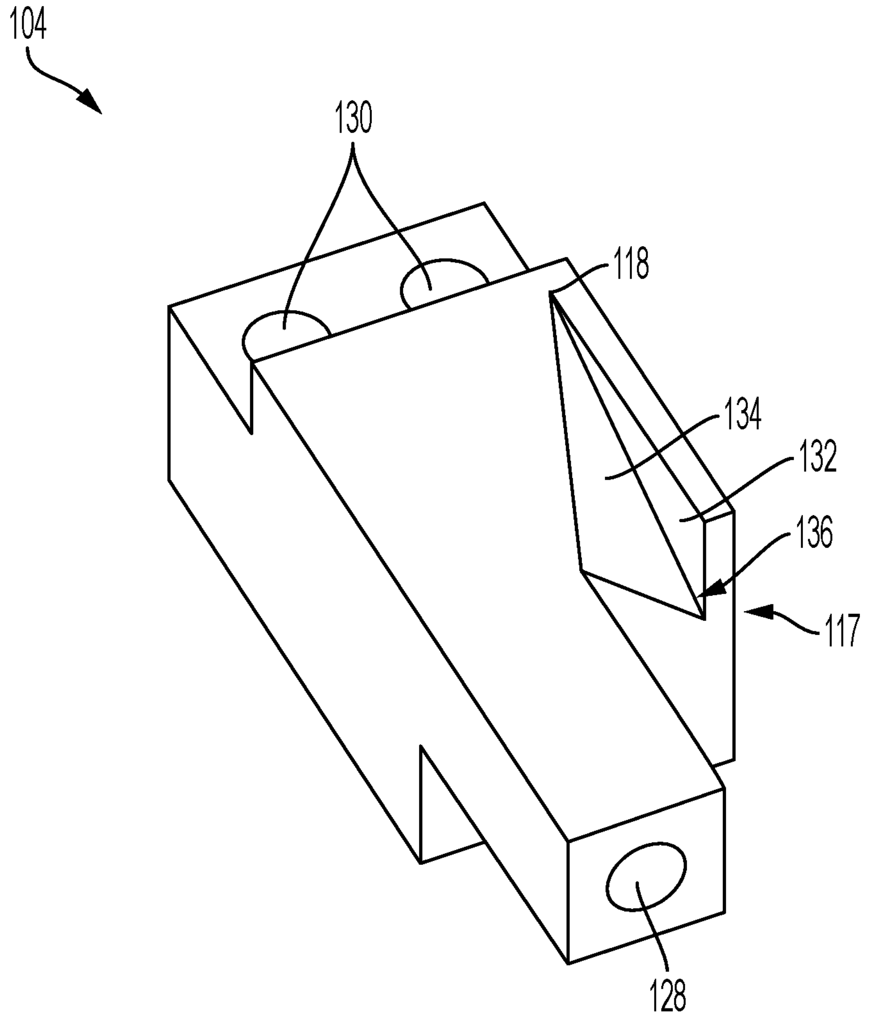
FIG. 6 is an isometric view of a bridge saddle of the multi-course bridge assembly shown in FIG. 1.
Figure 7:
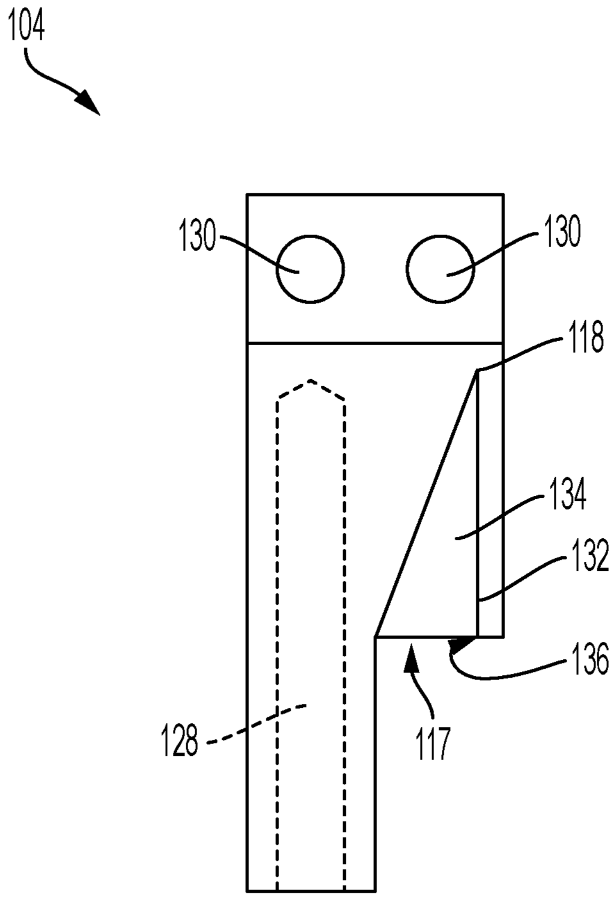
FIG. 7 is a top plan view of the bridge saddle of FIG. 6.
Figure 8:
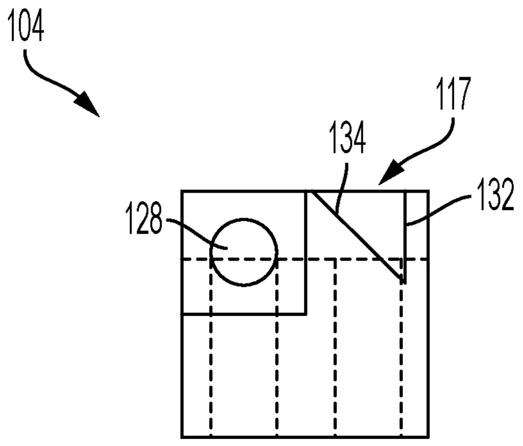
FIG. 8 is a back side elevation view of the bridge saddle of FIG. 6.
Figure 9:
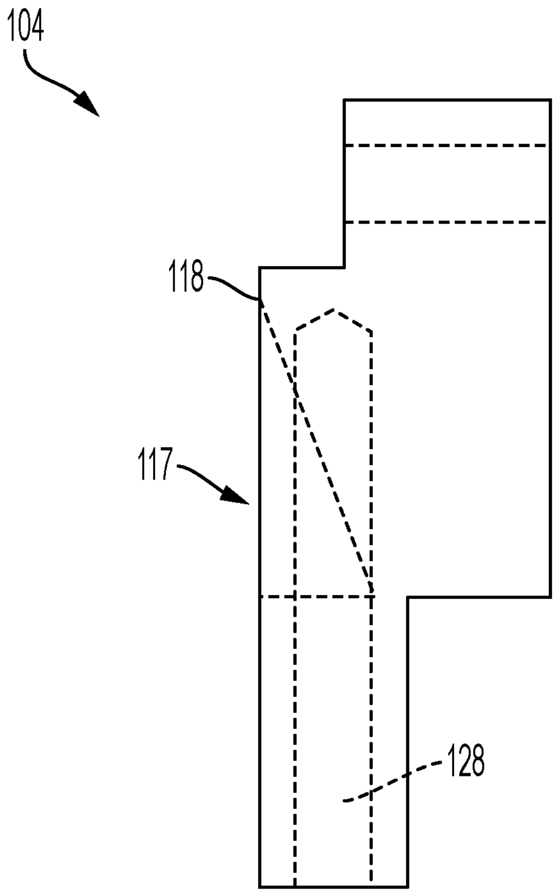
FIG. 9 is a right side elevation view of the bridge saddle of FIG. 6.

FIG. 1 illustrates an example of a multi-course bridge assembly 100. As shown in FIG. 1, the multi-course bridge assembly 100 includes a mounting plate 102 and eight adjustable bridge saddles 104. Each bridge saddle 104 is connected to the mounting plate 102 by a depth adjustment screw 106 surrounded by a biasing spring 108 and is elevated above a base surface 110 of the mounting plate 102 by a pair of height adjustment screws 112.

As shown in FIG. 1, the multi-course bridge assembly 100 shown in FIG. 1 is designed for an eight-string, four-course bass tuned in octave pairs. Accordingly, the multi-course bridge assembly 100 includes four pairs of mirror imaged bridge saddles 104 and a corresponding eight string holes 114 in a lower portion of a back wall 116 of the mounting plate 102, with two string holes 114 located between each pair of mirror imaged bridge saddles 104.

The bridge saddles 104 of the multi-course bridge assembly 100 shown in FIG. 1 each include a groove 117 for seating a string. Accordingly, in use, a bass string passes through a string hole 114, seats within a groove 117, and passes over a witness point 118, after which the vibrating length of the string begins.

Turning to FIGS. 2-5, the mounting plate 102 is shown without the bridge saddles 104. In this unobstructed view, one can see that in addition to the eight string holes 114 in the lower portion of the back wall 116, there are also eight depth adjustment screw holes 120 in an upper portion of the back wall 116 through which a corresponding depth adjustment screw 106 is mounted. Further, the mounting plate 102 includes five mounting screw holes 122 in the base surface 110 for securing the multi-course bridge assembly 100 to an instrument. There is also a locking screw hole 124 in a side wall 126 of the mounting plate 102, through which a locking screw (not shown) can be threaded to extend through the side wall 126 to contact the side of the nearest bridge saddle 104 and, by applying pressure to that bridge saddle 104, lock the entire series of bridge saddles 104 into position.

FIGS. 6-9 show an individual bridge saddle 104. As shown, the bridge saddle 104 includes a groove 117, an internally threaded depth adjustment hole 128 for receiving a depth adjustment screw 106, and two internally threaded height adjustment holes 130 for receiving height adjustment screws 112.

As shown, the groove 117 is formed by the intersection of two planar surfaces; a vertical planar surface 132 and an angled planar surface 134. The groove 117 transitions from a wider and deeper portion 136 towards the back of the groove 117 to a witness point 118 at the front of the groove 117. Accordingly, when a string is seated in the groove 117, and the string seats at least half of its diameter into the groove 117, the vertical planar surface 132 aligns tangentially with the outer diameter of the string (i.e., the string edge). Accordingly, by positioning the vertical planar surfaces 132 of adjacent, mirror imaged, bridge saddles 104 towards each other, the edge-to-edge string spacing between pairs of strings on adjacent bridge saddles 104 is consistent and fixed, regardless of the gauge string held in each groove 117. In addition, because of the alignment of the bridge saddles 104 across the width of the mounting plate 102 as shown in FIG. 1, the centerline-to-centerline distance between each saddle pair 104 is consistent and fixed, regardless of the gauge string held in each groove 117.

As further shown in FIGS. 6-9, the body of the bridge saddle 104 is generally L-shaped. The longer portion of the body includes the depth adjustment hole 128. The groove 117 is located in the wider portion of the body offset from the depth adjustment hole 128. The two depth adjustment holes 128 are located near the front of the body where the top surface steps down in elevation such that the height adjustment screws 112 are located below the witness point 118 of the groove 117 to avoid interfering with the vibration of the string in use.

Figure 10:
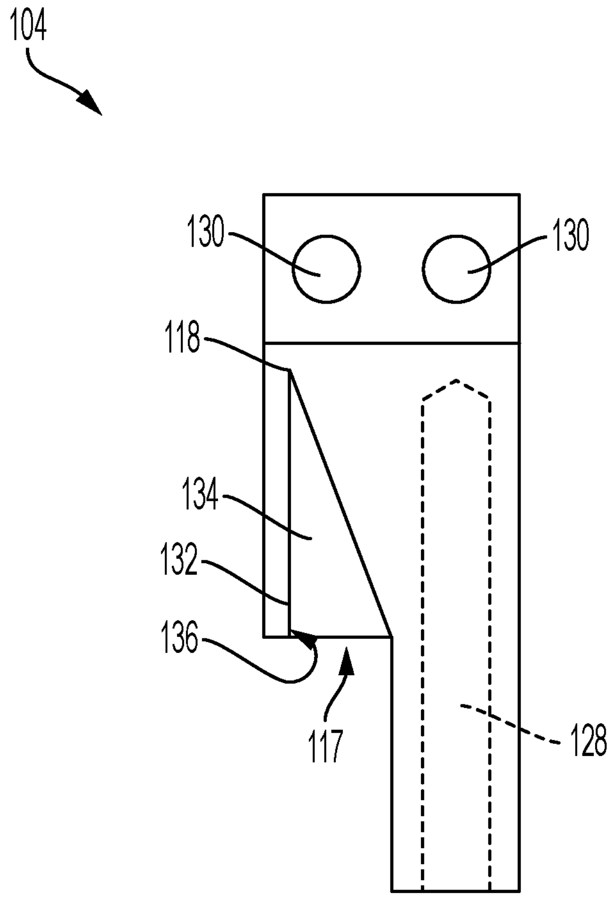
FIG. 10 is a top plan view of a bridge saddle that is the mirror image pair of the bridge saddle of FIG. 6.
Figure 11:
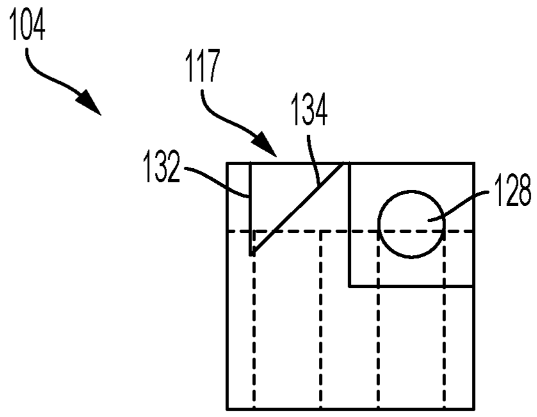
FIG. 11 is a back side elevation view of the bridge saddle of FIG. 10.

FIGS. 10 and 11 illustrate a bridge saddle 104 that is the mirror image pair of the bridge saddle 104 shown in FIGS. 6-9. Each pair of bridge saddles 104 in the multi-course bridge assembly 100 includes one bridge saddle 104 as shown in FIGS. 6-9 and one bridge saddle 104 as shown in FIGS. 10 and 11.

In one example of an eight-string, four-course bass bridge, the string edge-to-string edge spacing within each course is 0.070 inches (0.035 inches times two) and the centerline-to-centerline distance between each saddle pair is 0.700 inches (0.350 inches times two). The angle of the angled planar surface 134 is 45 degrees from a vertical axis and 20 degrees from a horizontal axis. Of course, those skilled in the art will recognize the range of adaptations to the dimensions that may be implemented to make multi-course bridge assemblies 100 for various instruments, string gauges, and various numbers of courses.

Accordingly, it should be noted that various changes and modifications to the presently preferred embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

What is claimed is:

1. A multi-course bridge assembly comprising:
a mounting plate; and
a plurality of bridge saddles secured to the mounting plate, wherein each bridge saddle includes a groove formed by the intersection of a vertical planar surface and an angled planar surface, wherein the groove tapers from being wider and deeper near a back side of the bridge saddle to being narrower and shallower near a front side of the bridge saddle.

2. The multi-course bridge assembly of claim 1, wherein the bridge saddles are arranged in mirror image pairs.

3. The multi-course bridge assembly of claim 2, wherein the vertical planar surface of each bridge saddle in each mirror image pair is located closer to the vertical planar surface of the paired bridge saddle than to the angled planar surface of the paired bridge saddle.

4. The multi-course bridge assembly of claim 3, wherein each bridge saddle includes an internally threaded depth adjustment hole and two internally threaded height adjustment holes.

5. The multi-course bridge assembly of claim 4, wherein the two height adjustment holes are located below the narrower and shallower portion of the groove.

6. The multi-course bridge assembly of claim 4, wherein the groove is offset laterally from the depth adjustment hole.

7. The multi-course bridge assembly of claim 4, wherein the mounting plate includes a locking screw hole in a side wall.

* * * * *